United States Patent [19]

Poisson-Quinton et al.

[11] 4,281,810

[45] Aug. 4, 1981

[54] PROCESS AND AN INSTALLATION FOR THE CONTROL OF THE EFFICIENCY OF THE AERODYNAMIC SURFACES OF AN AIRCRAFT

[75] Inventors: Philippe Poisson-Quinton, Paris; Amédée P. Bevért, Nice; Hung Le Thuy, Le Plessis-Robinson, all of France

[73] Assignee: Office National d'Etudes et de Recherches Aerospatiales, France

[21] Appl. No.: 31,598

[22] Filed: Apr. 19, 1979

[51] Int. Cl.³ .................... B64C 5/00; B64C 13/00
[52] U.S. Cl. ...................... 244/75 R; 244/45 A; 244/87
[58] Field of Search .............. 244/45 A, 48, 75 R, 244/82, 87

[56] References Cited

U.S. PATENT DOCUMENTS

| 2,421,694 | 6/1947 | Hawkins | 244/45 A |
| 2,541,922 | 2/1951 | Hosford | 244/48 |
| 2,595,363 | 5/1952 | Lee | 244/87 |
| 2,960,285 | 11/1960 | Lopez | 244/82 |

Primary Examiner—Charles E. Frankfort
Attorney, Agent, or Firm—Staas & Halsey

[57] ABSTRACT

A process and an installation for the control of the efficiency of the aerodynamic surfaces of an aircraft, wherein control of the stability of flying aircrafts with the assistance of orientable auxiliary aerodynamic surfaces is achieved, the surfaces are connected to their operating structure through a device providing at will an engaged condition or a disengaged condition, and the process and installation may be used with profit on subsonic, supersonic and laboratory airplanes.

12 Claims, 8 Drawing Figures

PROCESS AND AN INSTALLATION FOR THE CONTROL OF THE EFFICIENCY OF THE AERODYNAMIC SURFACES OF AN AIRCRAFT

The present invention relates to the control of the efficiency of aircraft aerodynamic surfaces. Its object is in particular a process and an installation for the control of the efficiency of auxiliary aerodynamic surfaces such as the flying and stabilizing surfaces of aircrafts.

Generally, it relates to all aerodynamic surfaces to which it can be applied, at least locally, on a portion which is made orientable with a view to obtaining a global determined efficiency, adapted to the various flying conditions.

In the prior art, the dimensions of the aerodynamic surfaces are established either for obtaining a suitable efficiency for the most critical flying conditions of the aircraft, or for specially optimizing some flight phases. The result is that in normal flights, or for other flight phases, the effect produced by said surfaces may become excessive or penalizing and leads to a deterioration of the qualities and performance of the flight.

The researches carried out by the Applicant in the field of aerodynamics and the control of aircrafts stability have led to the study and the development of a process and an installation allowing adapting the efficiency of the aerodynamic surfaces, particularly of auxiliary aerodynamic surfaces which are orientable and controlled by control means, to the various flight configurations of an aircraft.

Accordingly the application provides a control process and installation of the efficiency of the aerodynamic surfaces of an aircraft, comprising orientable aerodynamic surfaces operating according to a first operating mode consisting in controlling their orientation, or according to a second mode consisting in leaving them free to assume a position of equilibrium in the stream of air, said surfaces being connected on the one hand to actuating means for controlling their orientation, and on the other hand to setting means of their equilibrium position, wherein, for passing from one to the other of said operation modes, an action is applied to the control of a clutch means interposed between said orientable surfaces and the actuating means.

Thus, the invention presents the advantage of providing the aerodynamic surfaces to which it is applied the possibility of operating either in the "piloted mode" where its effect is maximum and corresponding to that for which it was designed, or in a "floating mode" where it becomes "transparent", producing namely a zero or very attenuated residual effect, or else an effect of determined magnitude.

As will be discussed herebelow, the effect produced in the "floating mode" may be adjusted to a desired value which may be fixed or variable, with the aim of contributing to the general operation of the aircraft.

To this aim, in the floating mode, the equilibrium conditions of the control surface in the air stream may be modified by any mechanical means located inside the aircraft using for instance counterweights and/or a damping device, or again by outer means such as a trailing edge flap or tab the steering of which is controlled.

The invention applies to aerodynamic surfaces of subsonic or supersonic aircrafts or airplanes with natural or artificial stability for all flight configurations. Amongst the aerodynamic surfaces to which the invention applies, one may particularly mention the "canard" type control surfaces, the flying surfaces and the fins.

The use of canard control surfaces exhibits a great interest for the operation of airplanes in very different flying conditions:

at lower speeds, it allows particulary increasing the lift, or for an equal lift, it allows improving the lift-drag ratio when taking off or landing;

at higher speeds, the use of canard control surfaces allows increasing substantially the manoeuvrability of the airplane, which is a quality particularly looked for in fighter planes.

However, for some high speed flying configurations, disadvantages appear such as for instance aerodynamic interactions with the flying surface, leading to the retraction of the canard control flying surfaces within the fuselage of the airplane, or to folding them so as to form vertical surfaces.

The invention avoids having recourse to such complex devices. As will be explained further down, the use of canard control surfaces to which the invention applies allows, in supersonic airplanes, passing from the subsonic condition to the supersonic condition without being penalized, as is the case in the prior art, by a large increase of the stability and by a balancing using an "off-set lift".

The tail fin of an airplane should be sized so as to compensate for the dissymmetric moments, particularly, eventually, that due to a disabled engine of a multi-engine airplane. Consequently, under normal conditions, the airplane is very sensitive to side-slips and may exhibit an important yawing return moment leading in practice to a deterioration of the performance and flying qualities of the airplane. The application of the invention to a portion of the tail fin allows, while preserving the maximum efficiency for critical cases, limiting the efficiency of the fin when flying under normal conditions to a value providing the aircraft with a notable improvement of its flying capacity when side-slipping or subjected to strong side winds.

Various exemplary uses of a canard control surface according to the invention are now described for illustrating the technical improvements brought about by the invention.

EXAMPLE 1

Supersonic aircrafts: the longitudinal static stability of an airplane is characterized by the relative position of the centre of gravity relative to the centrum or center of pressure of the aircraft. Its magnitude is represented by the incidence return moment, the lever-arm of which is provided by the distance from the centre of gravity of the airplane to the aerodynamic centre. The limit of the rear trim is generally determined by these stability conditions in a subsonic flight.

The passage from a subsonic flight to a supersonic flight causes the backward displacement of the aerodynamic centre which increases the length of the hereabove mentioned lever-arm and causes a nosedive moment which has to be compensated for by a nose-lift moment, viz. by an "off-set lift" of the elevator. This flight configuration is not favourable for the fineness of the aircraft. In order to find again a convenient flight condition, particularly during the long stretches of a supersonic flight, one is led to apply remedies commanding the use of complex auxiliary means.

Said means consist generally in providing the aircraft with a load transfer device towards the rear so as to displace backwardly the trim of the aircraft in parallel with the backward displacement of the aerodynamic centre.

The invention avoids having to resort to such a device where the aircraft is provided with a canard control surface. As a matter of fact, the application of the invention to said control surface allows compensating for the backward displacement of the aerodynamic centre by moving the aerodynamic centre forward, and this is obtained by having the canard control surface passed from the subsonic flight floating mode to the supersonic flight piloted mode.

EXAMPLE 2

Airplanes with a controlled longitudinal stability. In such aircrafts, the centre of gravity is behind the aerodynamic centre, or in front but near the aerodynamic centre, and a compensation for a lack of natural stability is obtained with an automatic system supplying the return and damping moments which are necessary by operating the elevator, the steering of which is function of the incidence and pitch angular speed variations. The major disadvantage of this operation mode resides in the fact that it is indispensable to multiply, for reasons of reliability and safety, the automatic flying chains, thereby increasing notably the cost of the electronic equipment of the airplane.

The application of the invention to the canard control surface allows at will, and particularly when the flight is difficult, to move the aerodynamic centre backwards by passing to the floating mode and to provide the airplane with natural stability conditions which restore the possibility of controlling it.

EXAMPLE 3

Laboratory airplanes: The canard control surface according to the invention, which allows displacing the aerodynamic centre of the airplane as hereabove explained, provides the invention with an interesting possibility of being applied to laboratory airplanes in which it allows modifying the stability at will and coming back to the initial conditions, thereby allowing adjusting and qualifying during the flight the stability control devices.

The following description is given with reference to the accompanying drawings wherein.

Figure 1A:
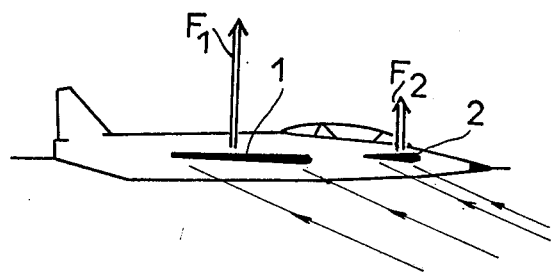
FIG. 1a is a schematic representation of an aircraft provided with a canard control surface in a fixed or flying condition (operating in the "piloted mode")
Figure 1B:
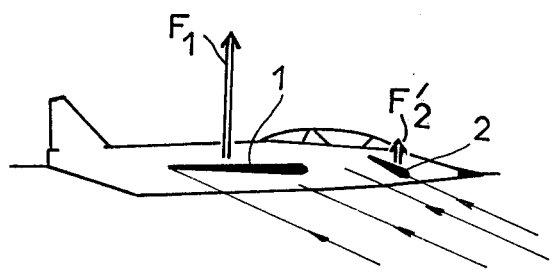
FIG. 1b is a schematic representation similar to that of FIG. 1a, where the canard control surface is in the disengaged condition (operating in the "floating mode")

In FIGS. 1a and 1b, reference numeral 1 designates the main flying surface of an airplane, numeral 2 a canard control surface articulated along an axis situated in a horizontal plane and disposed transversely relative to the longitudinal axis of the airplane. In FIG. 1a, control surface 2 is under the dependence of the control moments. It operates in a piloted mode (P mode), viz. its setting may be modified or maintained fixed relative to the airplane. During the evolutions of the airplane, the control surface 2, in this condition, operates at the same incidence variations as the flying surface 1 and partakes to the operation of the airplane by producing in particular, on the one hand a nose up moment originating from force F2 which varies with the incidence, and on the other hand a forward displacement of the general aerodynamic centre of the aircraft causing a decrease of the longitudinal stability due to the position of the canard situated in the front of the flying surface.

In FIG. 1b, the control surface is made floating (operating in the F mode), meaning that it is free in rotation about an axis situated substantially perpendicular to the flight direction. The rotation axis 6, visible in FIG. 2, being in front of the aerodynamic centre Fc of the canard, the control surface 2 takes its bearings in the wind's eye and operates under an incidence and a lift F2 of constant and low or zero value, which remains independent of the incidence variations of the airplane. In practice, under such conditions, it may be considered that the control surface does not partake to the incidence operation, being then called "transparent", and the effects hereabove mentioned for the P mode (nose up moment and forward displacement of the aerodynamic centre) disappear. Compared to the case of FIG. 1a, there is therefore an increase of the longitudinal stability and, moreover, the aerodynamic interaction with the flying surfaces becomes negligible.

When operating in this F mode, apart from a low constant influence originating in the residual force F2, the aircraft operates as if it was not equipped with a canard control surface or if the latter was in a retracted position.

Figure 2:
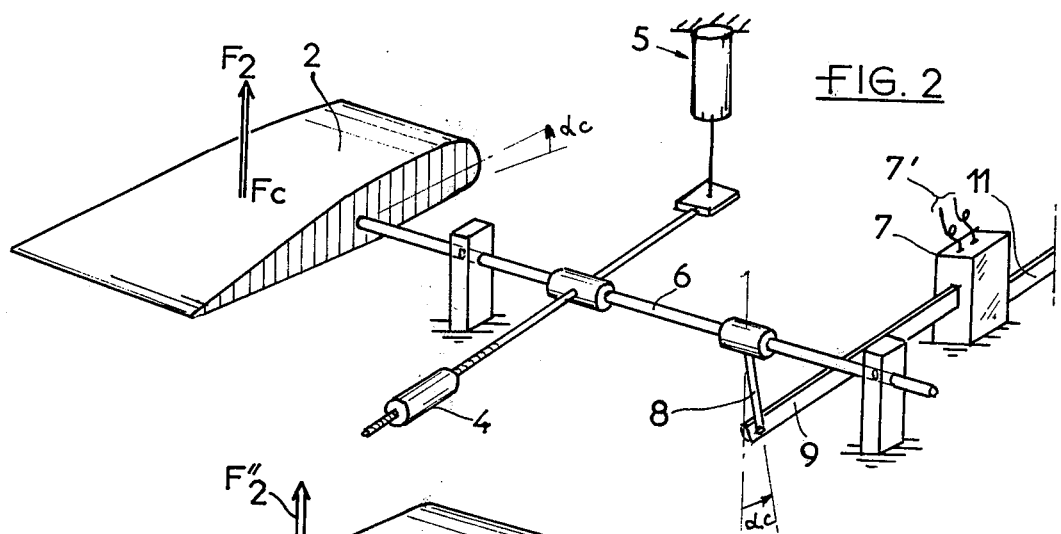
FIG. 2 shows schematically a control surface according to the invention.

FIG. 2 shows schematically the means allowing setting the trim position of the control surface 2 operating in the F mode. This position results from the equilibrium of the moments about the rotation axis 6, that is the equilibrium between the moment of aerodynamic origin from F2, the moment pertaining to the mass originating from the excentered position of the centre of gravity of the system relative to axis 6 and the setting moment due to the mechanism which comprises the counterweight 4 and the damping device 5.

The invention foresees setting the trim position of the control surface 2 by means of a setting mechanism 4-5 in order to reach a configuration such that the force produced assumes a desired value which may be fixed or variable. A first way consists in displacing the counterweight 4 which may be brought nearer or further from the rotation axis 6 by means of a motor, not shown.

Numeral 7 designates the engaging and disengaging device for the control surface 2. This device, the control of which is illustrated schematically at 7', provides between the connecting rod 9 which is rigid with the control surface 2 and the connecting rod 11 which is rigid with the control means of the control surface an engaged condition and a disengaged condition.

Figure 3:
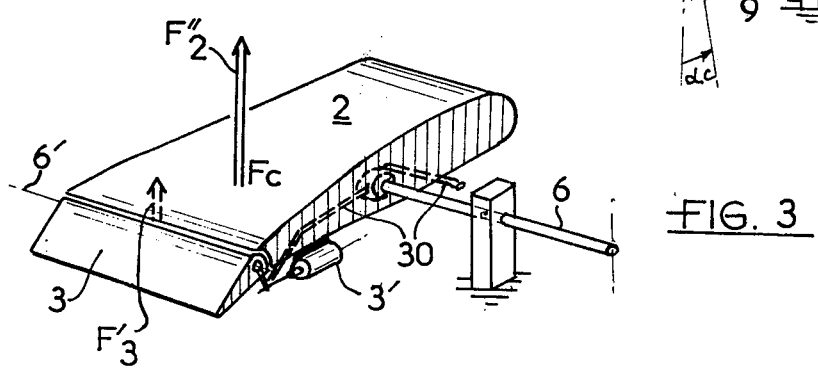
FIG. 3 is a schematic illustration of a control surface comprising a trailing edge flap or tab.

A second way for varying the trim condition of the control surface 2 is shown in FIG. 3. The control surface 2 is provided with an auxiliary flap 3 or tab articulated on the control surface 2 by means of a hinge the axis 6' of which is parallel to the rotation axis 6 of the control surface 2. The flap 3 is connected to the mobile part of a jack 3' the body of which is rigid with the control surface 2. The jack, shown outside the control surface 2 for the sake of clarity, is under the dependence of known control means establishing an appropriate piloting law. The deflection of the flap controlled by the jack 3' develops an aerodynamic force F'3 the moment of which causes a free pivoting of control surface 2 on its rotation axis 6 until it reaches a position such that there is an equilibrium with the opposed moment originating in the new force F"2 relative to control surface 2.

It may be seen that the invention not only allows producing a force usable for piloting with the assitance of a canard control surface operating in the floating mode, as is possible to produce with the assistance of a control surface of the prior art operating in the piloted mode, but it offers the extra advantage according to which the control surface of the invention which preserves substantially the same incidence in the air stream for all the incidences of the airplane does not modify the stability conditions of the airplane and eliminates the risk known as "stall" of the canard control surfaces of the prior art when the airplane flies at a great incidence.

Advantageously, the flap 3 is provided with a connecting rod 30 for controlling its position and which may be made rigid with the airplane when there is a break down of the flap control means, so that it is always possible to control the steering of the flap.

Figure 4A:
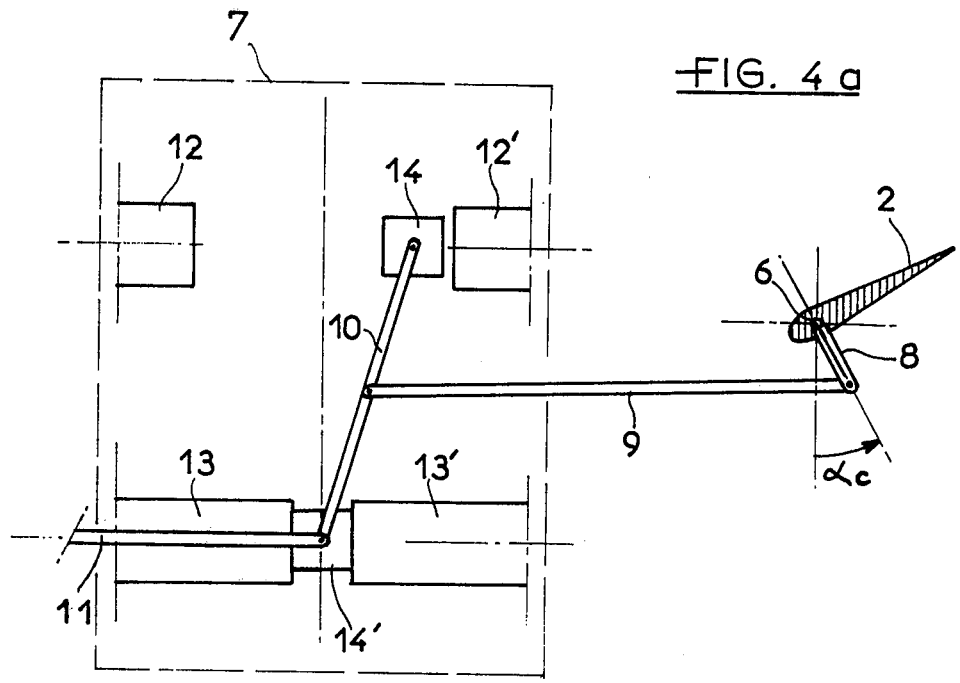
FIGS. 4a and 4b show schematically a clutch means or control installation of an aerodynamic surface comprising a mechanism allowing bringing it into a disengaged condition or into a piloting condition.
Figure 4B:
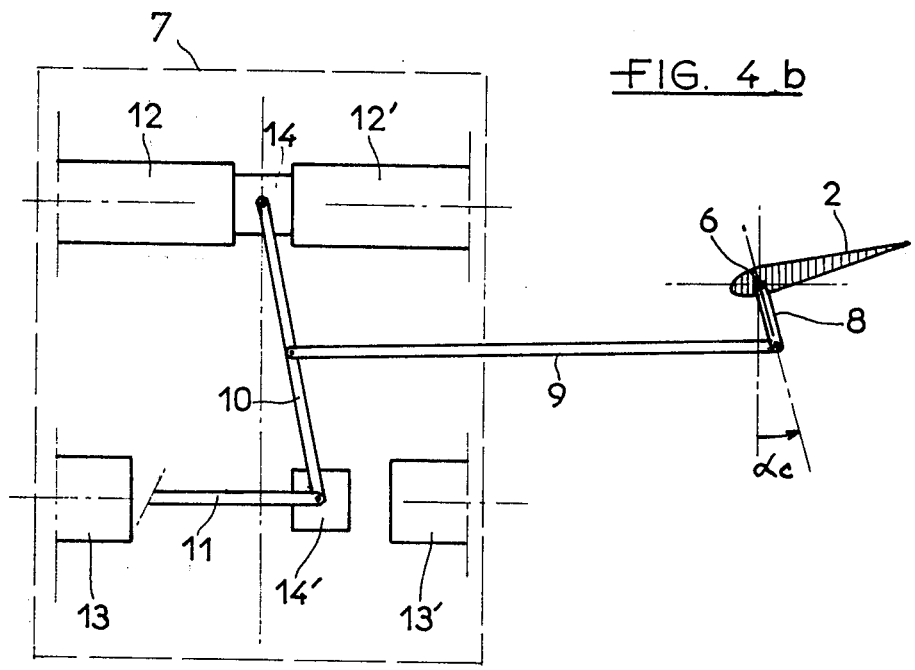

FIGS. 4a and 4b show schematically an embodiment of the mechanism allowing the passage from the P mode to the F mode and reversely in the most general case where the control surface 2 in the P mode may also be piloted under the action of a control 11.

The mechanism comprises substantially two pairs of symmetrically operating jacks (12,12'), (13,13') associated to a connecting rod system 8, 9, 10, 11. The connecting rod 8 is attached to the rotation axis 6 of the control surface 2, as is shown in FIG. 2. The connecting rod 10 comprises at each of its ends a block 14, 14' on which is exerted the effort originating in the jacks. For the sake of clarity of the drawings, only the elements which are essential for a good understanding of the invention have been shown, and the jacks are represented by their mobile elements.

According to FIG. 4a, the operation in the F mode is provided by maintaining the block 14' in a fixed position under the action of jacks 13 and 13' and by freeing block 14 by a symmetrical backward displacement of the jacks 12 and 12'. The control surface 2 is then free to move under the action of the aerodynamic force F'2. Its equilibrium position is determined as explained hereabove.

The passage to the P mode operation is obtained (FIG. 4b) by actuating the symmetrical movement towards each other of jacks 12 and 12' which, in their movement, bring back and maintain block 14 in the neutral position shown in the Figure. The control surface 2 is then locked. In the case where the control surface should also be piloted, the bringing together of the jacks 12 and 12' causes simultaneously the symmetrical backward movement of jacks 13 and 13' and the piloting action applied on connecting rod 11 allows steering the control surface 2 to the desired incidence.

Figure 5:
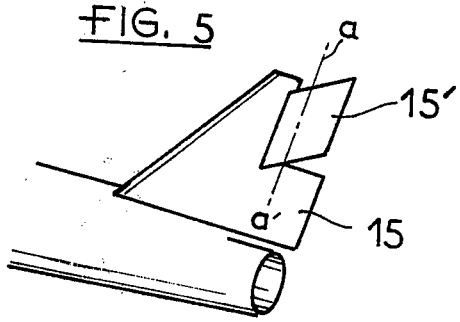
FIG. 5 illustrates an embodiment of the invention envolving a part only of a control surface.

In FIG. 5, the invention is applied to a portion only 15' of the rear vertical fin 15 of an airplane, by means of a device not shown which can be of the type as that mentioned with reference to FIGS. 3a and 3b. The end 15' of the control surface rotatably mounted about an axis a—a' substantially transverse to the longitudinal axis of the airplane is adapted for operating in the P mode or in the F mode, whereas the portion 15 of the control surface is fixed or under the piloting control. The advantage brought about by this alternative of the invention is that it is possible to size the whole assembly of the control surface and to choose the operation mode which is best adapted to each of the flight configurations of an airplane. Thus, it is possible to reduce the influence of side winds and to improve a side-slip flight or a flight with a cross wind. Moreover, according to the invention, the piloting of the control surface 15 in a disengaged condition by inner control means provides the extra possibility of a yaw piloting.

Figure 6:
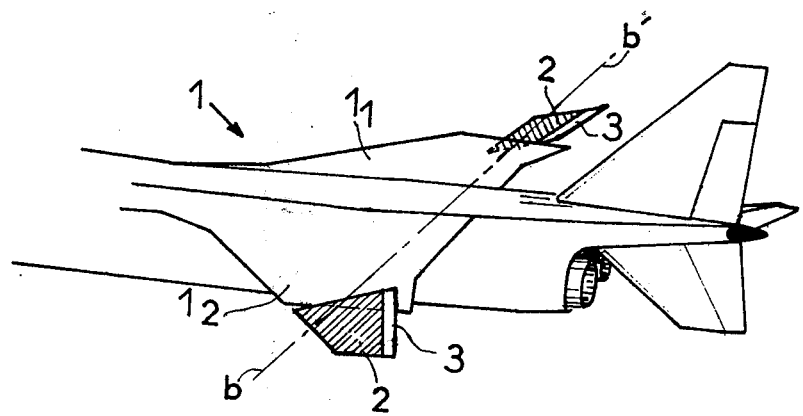
FIG. 6 shows an embodiment of the invention involving the ends of the main flying surfaces of an aircraft.

In FIG. 6, the invention is applied to a portion only of the main flying surface 1 of an aircraft. The ends 2 of each wing 11, 12 are rotatably mounted on said wings along an axis b—b' substantially transverse to the longitudinal axis of the airplane.

Auxiliary flaps 3 comprising steering control means are articulated onto the surfaces 2 along an axis parallel to the flying surface trailing edge.

The surface 2 may operate in the P mode or in the F mode due to a device not shown but which may be of the type described with reference to FIGS. 4a, 4b. Said device provides the engagement conditions in which the surfaces contribute to producing the total aerodynamic effect of the flying surface 1, or the disengaged condition in which the surfaces which take their bearings in the stream of air allow reducing the aerodynamic surface and the lift gradient so as to reduce for example the sensitiveness of the airplane to turbulences.

Moreover, according to the invention, the piloting of surfaces 2 via the flaps 3 allows preserving the totality of the roll control capacity of the airplane.

According to the object aimed at, the invention can be applied, on the same airplane, to one only of the surfaces of an appropriate type, or on the contrary simultaneously to several surfaces of different types.

We claim:

1. Apparatus for controlling the operation of an aerodynamic surface on an aircraft, comprising:
    means for mounting an aerodynamic surface on an aircraft to assume variable orientation with respect thereto;
    means for controlling the orientation of said surface with respect to the aircraft;
    means for connecting said controlling means to said surface comprising a first pivot member and linkage means pivotally connected to said first pivot member for permanently linking said controlling means to said surface;
    means for selectively blocking said first pivot member with respect to the aircraft to establish, in a blocking condition, a steerable connection between said controlling means and said surface to operate the same in a controlled mode, and to disable such connection, in a nonblocked condition thereof, to let said surface operate in a freely floating mode; and said selective blocking means includes a pair of oppositely movable jacks on either side of said first pivot member to block said first pivot member with respect to the aircraft by moving said jacks into engagement with said first pivot member, in the blocked condition thereof.

2. Apparatus according to claim 1, wherein said linkage means further is pivotally connected to said controlling means and to said surface.

3. Apparatus according to claim 2, wherein said linkage means comprises a linking arm pivotably connected to said first pivot member, said controlling means and said surface at respective spaced apart points therealong.

4. Apparatus according to claim 1, wherein said connecting means further includes additional means for blocking said controlling means when said selective blocking means of said first pivot member is released in the nonblocked condition thereof.

5. The apparatus of claim 1 wherein said connecting means includes a second pivot member rigidly connected to said controlling means and to which said linkage means is pivotally connected, and a second pair of jacks movable in opposite directions on either side of said second pivot member for blocking the same when moved into engagement with said second pivot member during the nonblocked condition of said first pivot member.

6. The apparatus of claim 1, further comprising means for adjusting the balance position of said surface in the free floating mode thereof.

7. The apparatus of claim 1 wherein said orientable surface is of the canard type and mounted in front of a main flying surface of the aircraft, said surface being pivotally mounted about an axis transverse to the flight direction of the aircraft.

8. The apparatus of claim 1, wherein said orientable surface is provided at the end of a main flying surface of the aircraft.

9. The apparatus of claim 1, wherein said orientable surface is a portion of a vertical fin of the aircraft.

10. An aircraft comprising:
a frame;
an orientable aerodynamic surface mounted to said frame to assume variable orientation with respect thereto;
means including a control member for controlling the orientation of said surface with respect to the frame;
means for connecting said control member to said surface comprising a support member, and a linking arm having a first point pivotally connected to said control member, a second point pivotally coupled to said surface and a third point pivotally connected to the support member; and
means for blocking said control member with respect to the frame while allowing said support member to move freely with respect thereto, in a first condition of said blocking means to provide a free floating mode of operation of said surface, and for releasing said control member and blocking said support member with respect to the frame to provide a steering connection between said control member and said surface to provide a controlled operating mode of said surface in a second condition of said blocking means.

11. The apparatus of claim 10 wherein said blocking means comprises a first pair of jacks movable in opposite directions on either side of said support member to block the same in a predetermined position with respect to said frame when brought together in engagement with said support member in the second condition of said blocking means.

12. The aircraft of claim 10 wherein said control member comprises a pivot member to which said first point is pivotally connected, said blocking means comprises a second pair of jacks movable in opposite directions on either side of said pivot member to block the same in a predetermined position when in engagement therewith in said first condition and for releasing said pivot point in the second condition of said blocking means.

* * * * *